US011863640B2

(12) United States Patent
Gamache et al.

(10) Patent No.: US 11,863,640 B2
(45) Date of Patent: *Jan. 2, 2024

(54) SYSTEM, METHOD, AND APPARATUS FOR GENERATING A THIRD-PARTY RESOURCE USAGE MAP IN A GROUP BASED COMMUNICATION SYSTEM

(71) Applicant: Slack Technologies, LLC, San Francisco, CA (US)

(72) Inventors: Meagan Gamache, San Francisco, CA (US); Buster Benson, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,147

(22) Filed: Sep. 26, 2022

(65) Prior Publication Data

US 2023/0156096 A1    May 18, 2023

Related U.S. Application Data

(63) Continuation of application No. 16/927,214, filed on Jul. 13, 2020, now Pat. No. 11,489,932, which is a
(Continued)

(51) Int. Cl.
*H04L 67/53*     (2022.01)
*H04L 9/40*      (2022.01)
*H04L 67/50*     (2022.01)

(52) U.S. Cl.
CPC .......... *H04L 67/53* (2022.05); *H04L 63/0807* (2013.01); *H04L 67/535* (2022.05); *H04L 63/10* (2013.01)

(58) Field of Classification Search
CPC ..... H04L 63/0807; H04L 63/10; H04L 67/20; H04L 67/22; H04L 9/3213; H04L 41/28
See application file for complete search history.

(56) References Cited

U.S. PATENT DOCUMENTS

| 8,929,257 B1 | 1/2015 | Goepp et al. |
| 8,970,660 B1 | 3/2015 | Rudkowski et al. |
| (Continued) | | |

FOREIGN PATENT DOCUMENTS

| WO | WO2008128349 A1 | 10/2008 |
| WO | WO2015179406 A1 | 11/2015 |

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Kostas J Katsikis
(74) *Attorney, Agent, or Firm* — Lee & Hayes, P.C.

(57) ABSTRACT

Embodiments of the present disclosure provide methods, systems, apparatuses, and computer program products for generating a third-party resource usage map in a group based communication system, where the third-party resource usage map comprises a plurality of third party resource usage records and each third-party resource usage record comprises a user identifier, a third-party resource provider identifier, and a third-party resource access token.

20 Claims, 14 Drawing Sheets

Related U.S. Application Data continuation of application No. 16/212,225, filed on Dec. 6, 2018, now Pat. No. 11,099,359.

(60) Provisional application No. 62/599,482, filed on Dec. 15, 2017.

(56) References Cited

U.S. PATENT DOCUMENTS

| | | | |
|---|---|---|---|
| 9,609,457 | B2 | 3/2017 | Bhagavatula et al. |
| 10,110,586 | B1 | 10/2018 | Tyer |
| 10,783,518 | B1 | 9/2020 | Pearce |
| 2007/0143827 | A1 | 6/2007 | Nicodemus et al. |
| 2009/0144786 | A1 | 6/2009 | Branam et al. |
| 2010/0222139 | A1 | 9/2010 | Wang |
| 2012/0147127 | A1 | 6/2012 | Satterlee et al. |
| 2013/0047247 | A1 | 2/2013 | Matsuda |
| 2013/0198818 | A1 | 8/2013 | Hitchcock et al. |
| 2013/0238492 | A1 | 9/2013 | Muthu et al. |
| 2014/0215595 | A1 | 7/2014 | Prasad et al. |
| 2014/0379598 | A1 | 12/2014 | Perrone et al. |
| 2015/0180857 | A1 | 6/2015 | Schulman et al. |
| 2015/0350210 | A1 | 12/2015 | Thibadeau, Sr. et al. |
| 2015/0379544 | A1 | 12/2015 | Matejka |
| 2016/0165006 | A1 | 6/2016 | Fitzpatrick et al. |
| 2016/0191482 | A1 | 6/2016 | Truelove et al. |
| 2016/0295163 | A1 | 10/2016 | Shiro et al. |
| 2016/0358161 | A1 | 12/2016 | Cobban et al. |
| 2017/0116615 | A1 | 4/2017 | Burgess et al. |
| 2017/0310698 | A1 | 10/2017 | Klemm et al. |
| 2018/0123804 | A1 | 5/2018 | Smith et al. |
| 2018/0167371 | A1* | 6/2018 | Gordon ............... H04L 63/083 |
| 2018/0287982 | A1 | 10/2018 | Draeger et al. |
| 2018/0337795 | A1 | 11/2018 | Katrak et al. |
| 2018/0352430 | A1* | 12/2018 | Mansour ............. H04W 12/069 |
| 2019/0026328 | A1 | 1/2019 | Jin et al. |
| 2019/0058680 | A1 | 2/2019 | Rosania et al. |
| 2019/0087432 | A1 | 3/2019 | Sion et al. |
| 2019/0199808 | A1 | 6/2019 | Gamache et al. |
| 2020/0344312 | A1 | 10/2020 | Gamache et al. |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Office Action for U.S. Appl. No. 16/927,214, dated Nov. 26, 2021, Garnache, "System, Method, and Apparatus for Generating a Third Party Resource Usage Map in a Group Based Communication System", 27 Pages.

Office Action for U.S. Appl. No. 16/927,214, dated Apr. 11, 2022, Gamache, "System, Method, and Apparatus for Generating a Third Party Resource Usage Map in a Group Based Communication System", 35 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

300

| | User Identifier | Third Party Resource Provider Identifier | Third Party Resource Access Token | Group Identifier | Group-based Communication Channel Identifier | Organization Identifier |
|---|---|---|---|---|---|---|
| 310 | | | | | | |
| 301 | User Identifier 1 | 1st Third Party Resource Provider Identifier | 1st Third Party Resource Access Token | Group Identifier 1 | Group-based Communication Channel Identifier 1 | Organization Identifier 1 |
| 302 | User Identifier 1 | 2nd Third Party Resource Provider Identifier | 2nd Third Party Resource Access Token | Group Identifier 1 | Group-based Communication Channel Identifier 1 | Organization Identifier 1 |
| 303 | User Identifier 2 | 1st Third Party Resource Provider Identifier | 1st Third Party Resource Access Token | Group Identifier 1 | Group-based Communication Channel Identifier 1 | Organization Identifier 2 |
| 304 | User Identifier 3 | 3rd Third Party Resource Provider Identifier | 3rd Third Party Resource Access Token | Group Identifier 2 | Group-based Communication Channel Identifier 2 | Organization Identifier 2 |

FIG. 3

SYSTEM, METHOD, AND APPARATUS FOR GENERATING A THIRD-PARTY RESOURCE USAGE MAP IN A GROUP BASED COMMUNICATION SYSTEM

PRIORITY

This application is a continuation of U.S. application Ser. No. 16/927,214, filed Jul. 13, 2020, which is a continuation of U.S. patent application Ser. No. 16/221,225, filed on Dec. 14, 2018, issued as U.S. Pat. No. 10,715,610 and which claims priority to U.S. Provisional Application No. 62/599,482 filed on Dec. 15, 2017, the entire contents of which are incorporated herein by reference in their entirety.

TECHNICAL FIELD

A third-party resource provider may provide a third-party resource among users within a communication system. Through applied effort, ingenuity, and innovation, many identified problems have been solved by developing solutions that are included in embodiments of the present disclosure, many examples of which are described in detail herein.

BRIEF SUMMARY

This specification relates to generating and maintaining a third-party resource usage map in a group-based communication system. In one embodiment, a computing entity or apparatus is configured to receive, from a third-party resource provider, a third-party resource access token, where the third-party resource access token is associated with a third-party resource provider identifier that is associated with the third-party resource provider. The apparatus is further configured to transmit a third-party user account creation request along with the third-party resource access token to the third-party resource provider to create a third-party user account associated with the third-party resource provider on behalf of a client device associated with a user identifier. The apparatus is further configured to receive a third-party user account creation approval from the third-party resource provider in response to the third-party user account creation request after verifying the third-party resource access token for creating the third-party user account associated with the third-party resource provider on behalf of the client device associated with the user identifier. The apparatus is further configured to generate a third-party resource usage record associated with the user identifier, where the third-party resource usage record comprises the user identifier, the third-party resource provider identifier, and the third-party resource access token. The apparatus is further configured to add the generated third party resource usage record to the third-party resource usage map. The third-party resource usage record indicates the third-party user account associated with the third-party resource provider was created on behalf of the client device associated with the user identifier.

The apparatus is optionally additionally configured to receive, from the client device, a first third-party resource access request, where the first third-party resource access request comprises the user identifier and a first third-party resource provider identifier associated with a first third-party resource provider. The apparatus is optionally additionally configured to search the third-party resource usage record associated with the user identifier to determine if a first third-party user account was created on behalf of the client device associated with the user identifier.

In a circumstance where the first third-party resource provider identifier is determined to be stored to the third-party resource usage record associated with the user identifier, the apparatus is additionally configured to transmit a first third-party resource access token to the first third-party resource provider to enable the client device access to a first third-party resource. In a circumstance where the first third-party resource provider identifier is not determined to be stored to the third-party resource usage record associated with the user identifier, the apparatus is additionally configured to transmit a first third-party user account creation request along with the first third-party resource access token to the first third-party resource provider to create the first third-party user account on behalf of the client device associated with the user identifier, receive a first third-party user account creation approval from the first third-party resource provider in response to the first third-party user account creation request after verifying the first third-party resource access token for creating the first third-party user account on behalf of the client device associated with the user identifier, and generate a new third-party resource usage record associated with the user identifier to store the first third-party resource provider identifier to the new third-party resource usage record associated with the user identifier and correlate the first third-party resource access token to the first third-party resource provider identifier.

The apparatus is optionally additionally configured to retrieve a plurality of third party resource usage records from a group-based communication repository, where each third-party resource usage record is associated with a different user identifier within a group-based communication system. And for those third-party resource usage records not including a second third-party resource provider identifier, the apparatus is optionally additionally configured to transmit access suggestions to client devices associated with user identifiers that are associated with those third-party resource usage records, where each access suggestion comprises the second third-party resource provider identifier and is configured to be rendered for displaying at the client device.

The apparatus is optionally additionally configured to receive, from the client device, a second third-party resource access request in response to an access suggestion, where the second third-party resource access request comprises the user identifier associated with the client device and the second third-party resource provider identifier. The apparatus is optionally additionally configured to transmit a second third-party user account creation request along with a second third-party resource access token to a second third-party resource provider to create a second third-party user account associated with the user identifier on behalf of the client device associated with the user identifier, receive a second third-party user account creation approval from the second third-party resource provider in response to the second third-party user account creation request after verifying the second third-party resource access token for creating the second third-party user account on behalf of the client device associated with the user identifier, and generate a new third-party resource usage record associated with the user identifier to store the second third-party resource provider identifier to the new third-party resource usage record associated with the user identifier and correlate the second third-party resource access token to the second third-party resource provider identifier.

Other embodiments include corresponding systems, methods, and computer programs, configured to perform the operations of the apparatus, encoded on computer storage devices. These and other embodiments can each optionally include one or more of the following features: the third-party resource usage record further comprises a group identifier, a group-based communication channel identifier, or an organization identifier, where the apparatus in configured to retrieve a plurality of third-party resource usage records associated with those user identifiers with a common group identifier, a common group-based communication channel identifier, or a common organization identifier; and the third-party resource usage record further comprises a first third-party resource usage indicator associated with a third-party resource provider for tracking how often the client device requesting access to the third-party resource provider.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Having thus described the disclosure in general terms, reference will now be made to the accompanying drawings, which are not necessarily drawn to scale. Similar reference numbers used in different figures represent a same or similar feature in the depicted examples.

Figure 1:
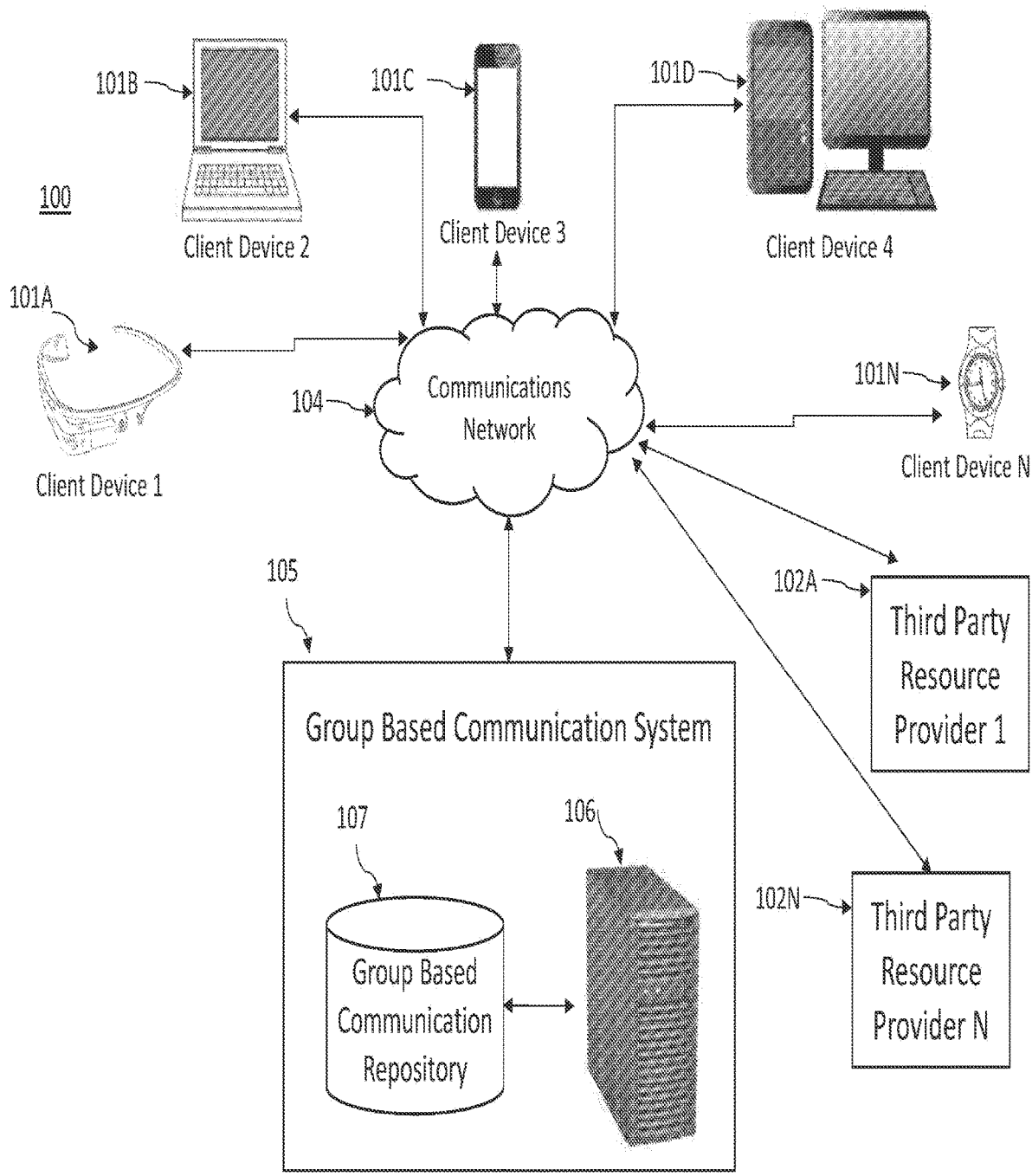

FIG. 1 is a system architecture diagram of a group based communication system configured to practice embodiments of the present disclosure.

Figure 2:
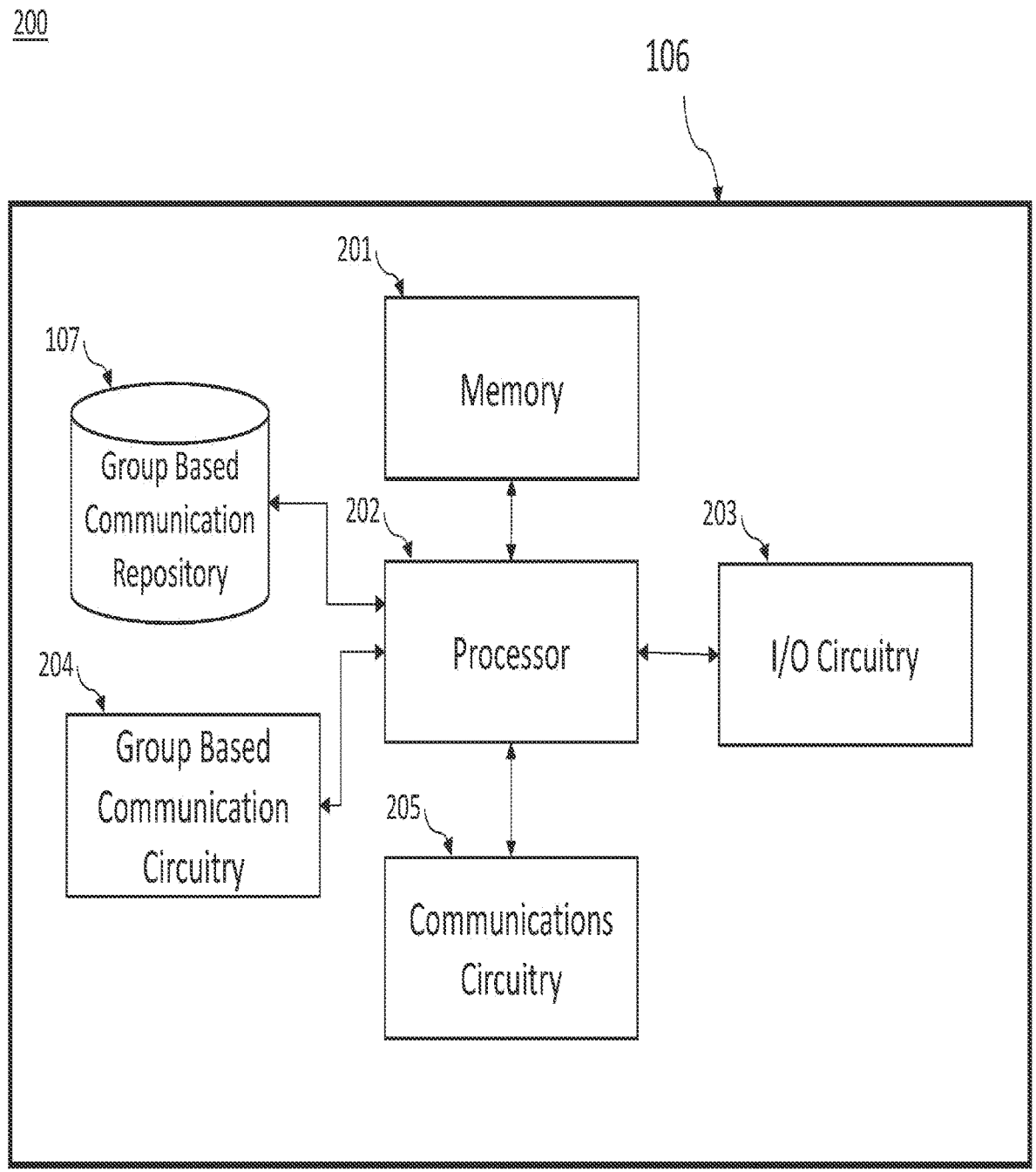

FIG. 2 is an exemplary schematic diagram of a computing entity according to one embodiment of the present disclosure.

FIG. 3 illustrates an exemplary third-party resource usage map for use with embodiments of the present disclosure.

Figure 4A:
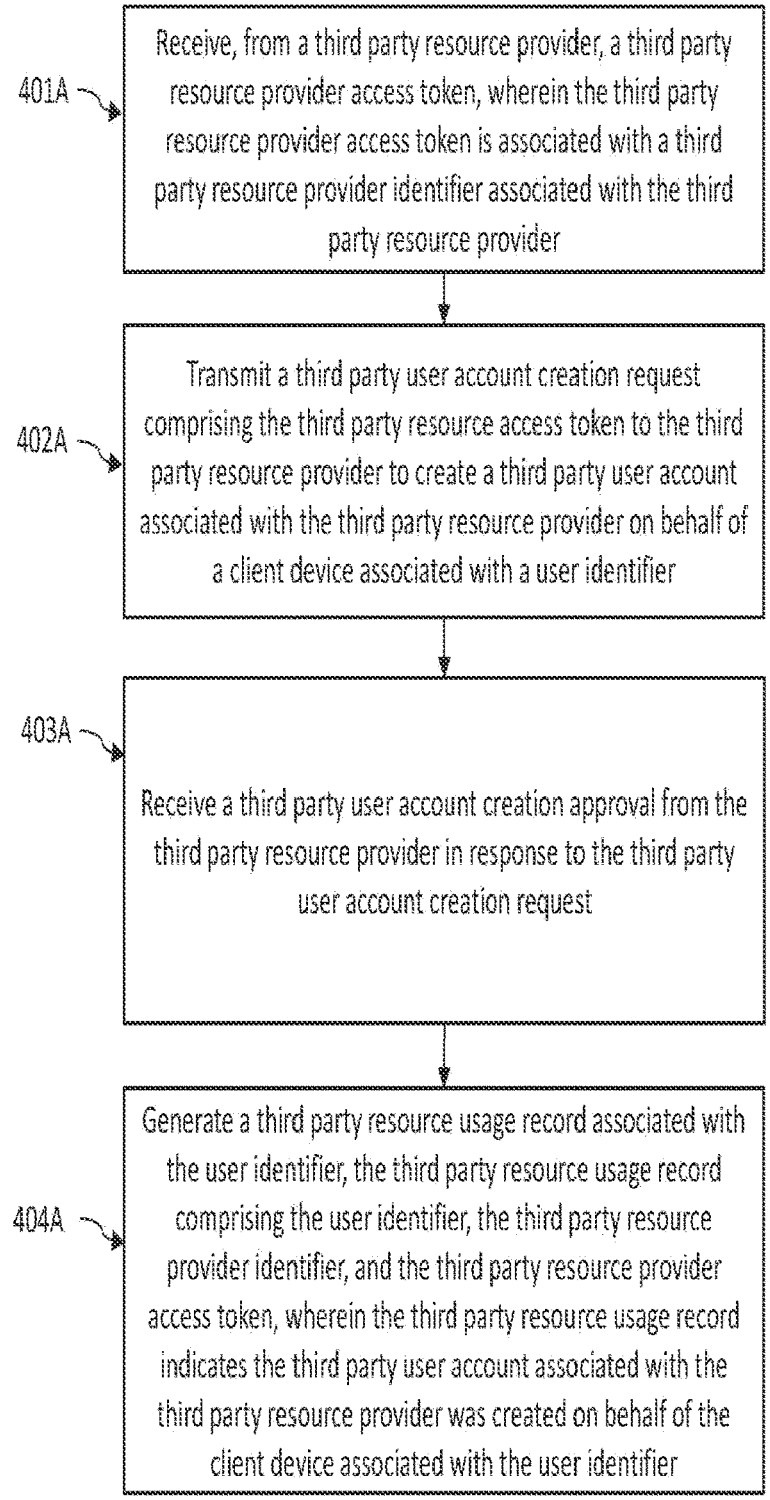
Figure 4B:
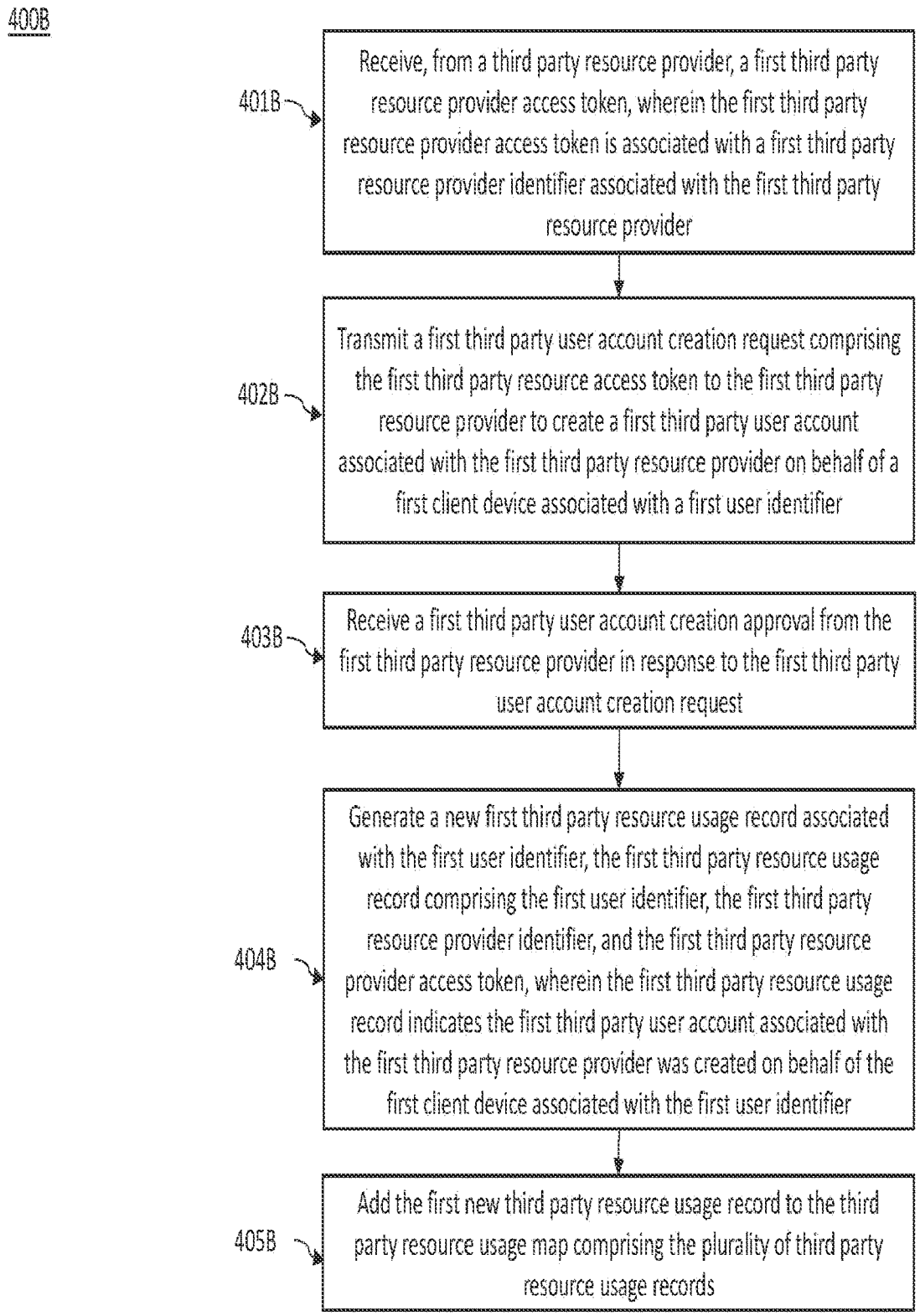

FIGS. 4A and 4B illustrate exemplary processes for maintaining a third-party resource usage map by generating a third-party resource usage record after creating a third-party user account on behalf of a client device according to one embodiment of the present disclosure.

Figure 5A:
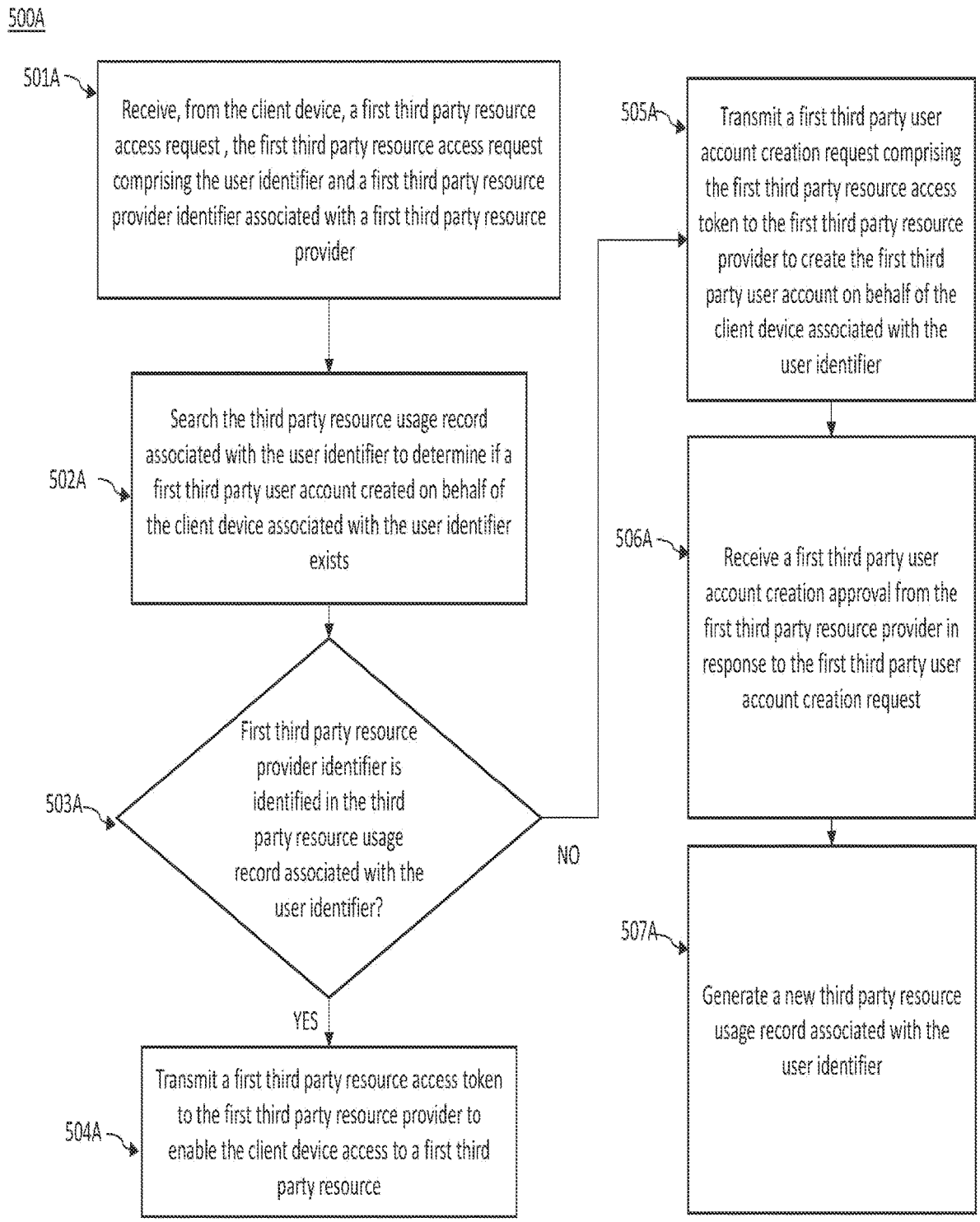
Figure 5B:
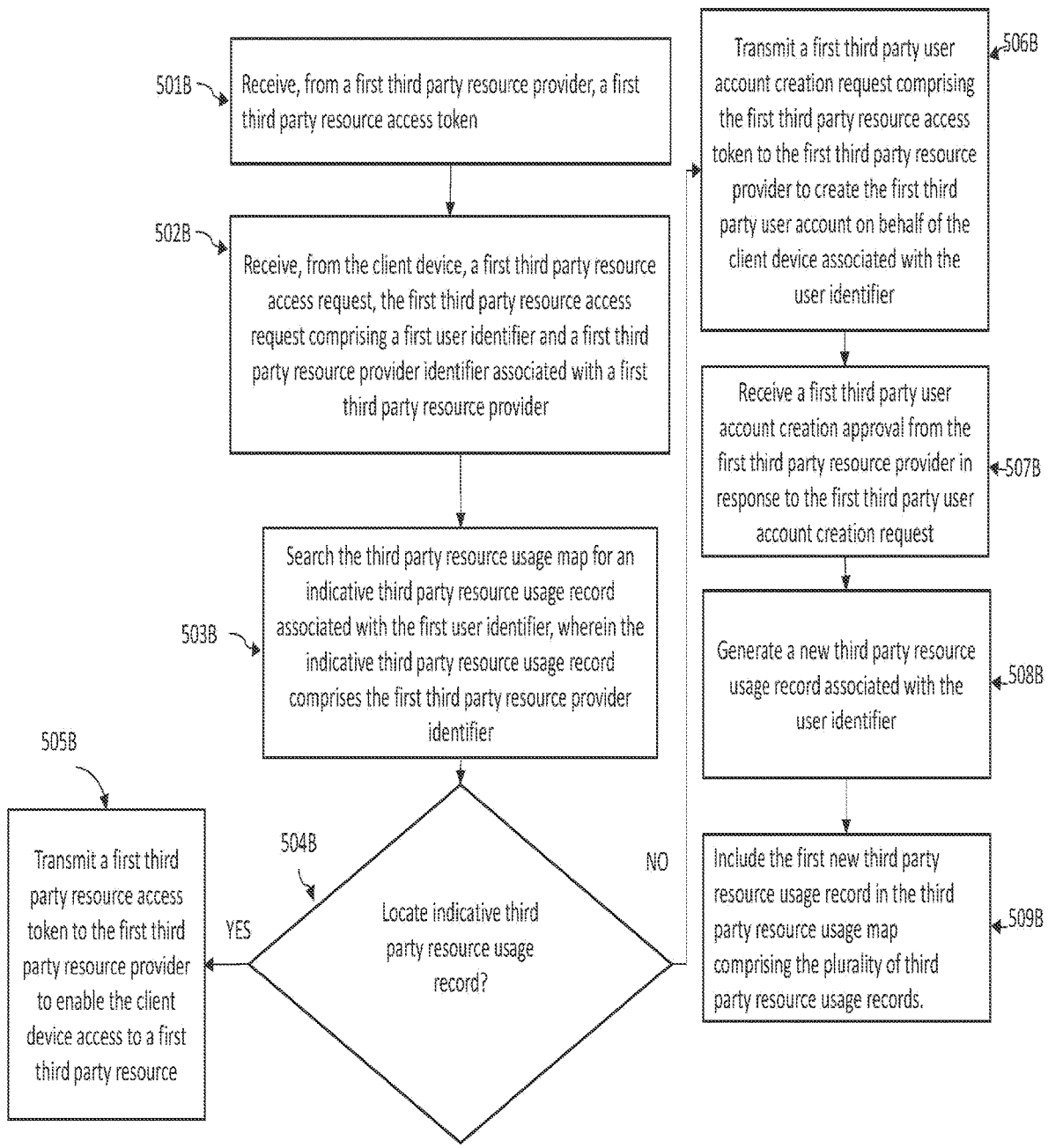

FIGS. 5A and 5B illustrate exemplary processes for maintaining a third-party resource usage map by generating a new third-party resource usage record after creating a third-party user account upon receiving a third-party resource access request from a client device according to one embodiment of the present disclosure.

Figure 6A:
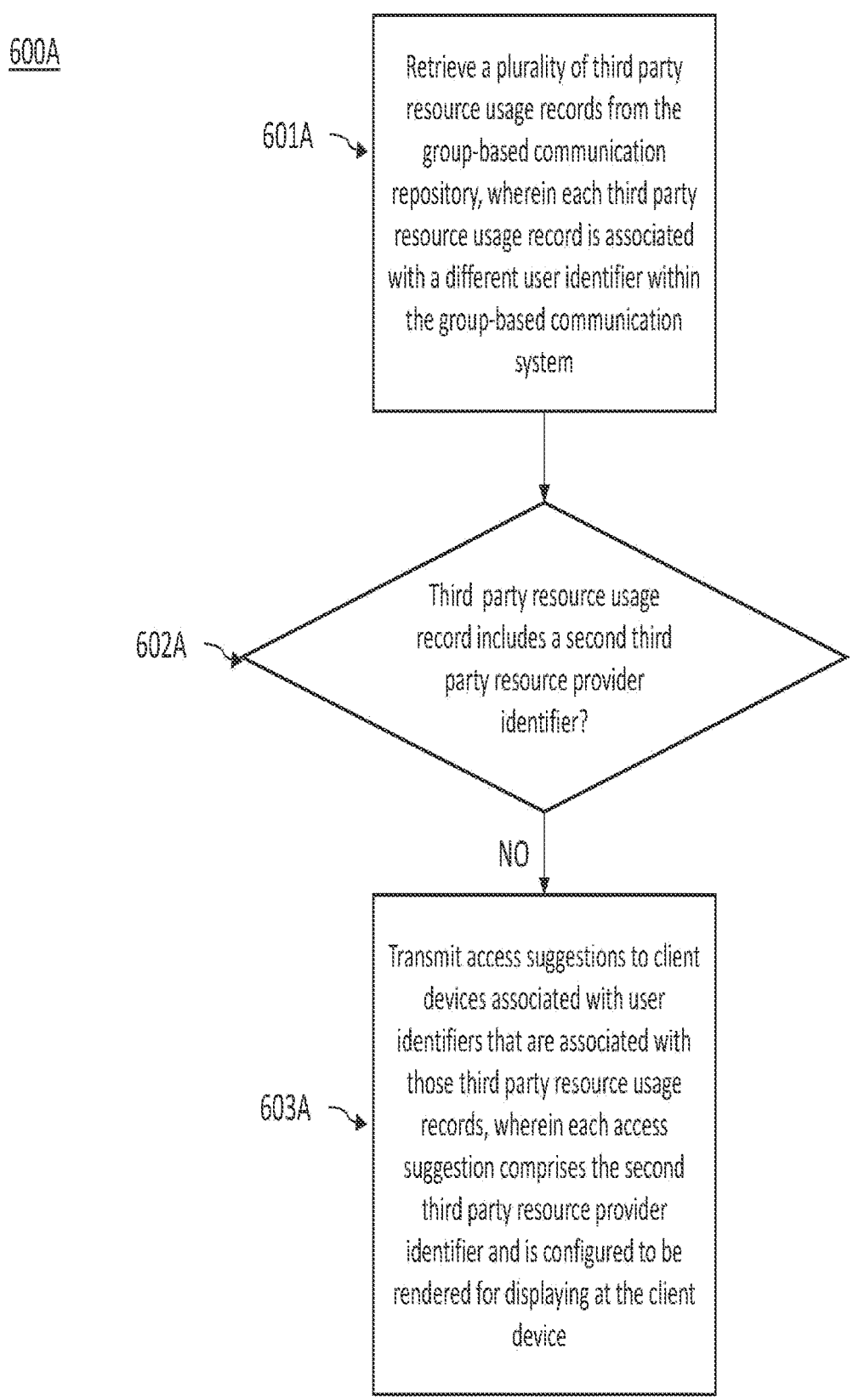
Figure 6B:
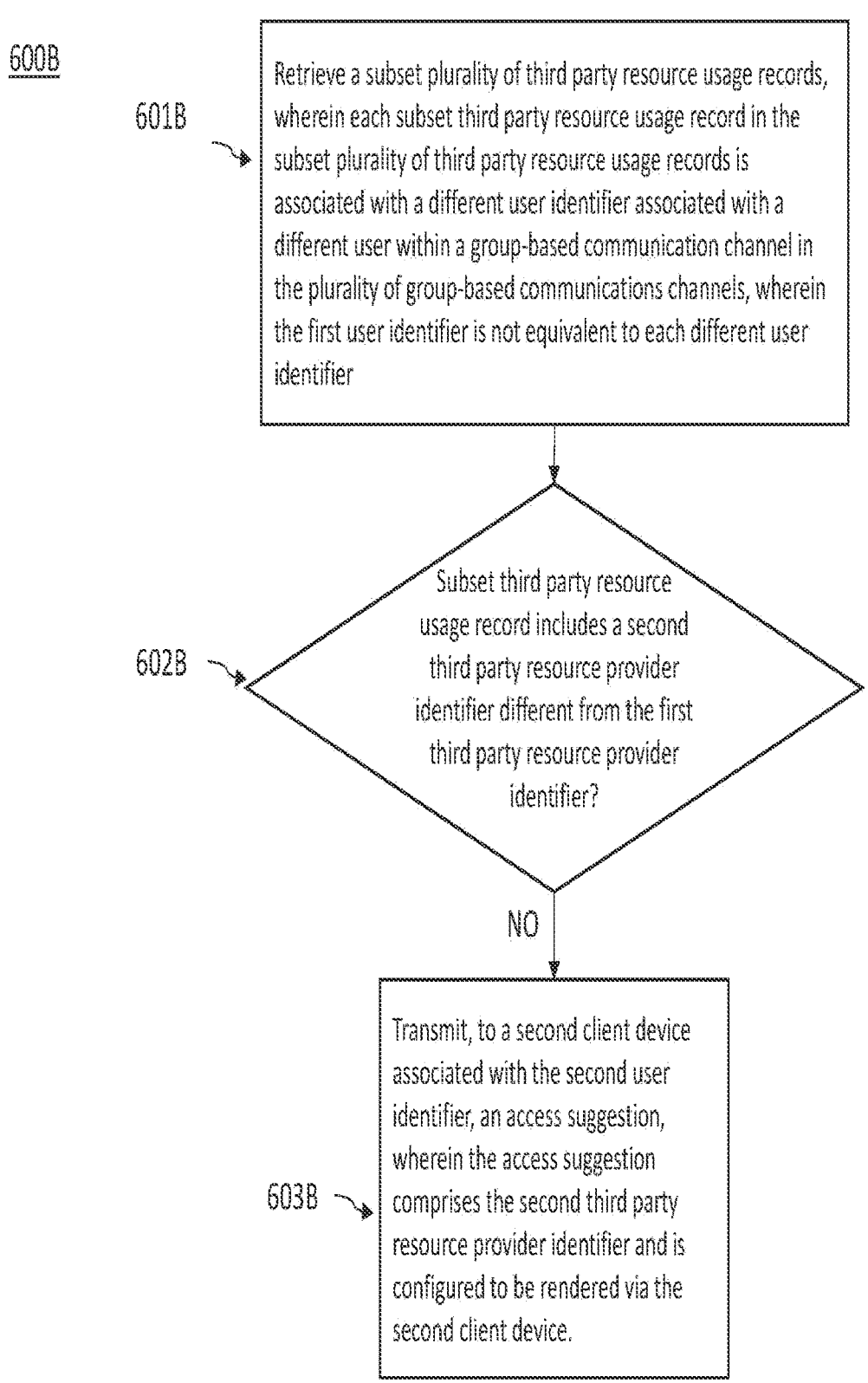

FIGS. 6A and 6B illustrate exemplary processes for maintaining a third-party resource usage map by transmitting access suggestions to client devices according to one embodiment of the present disclosure.

Figure 7A:
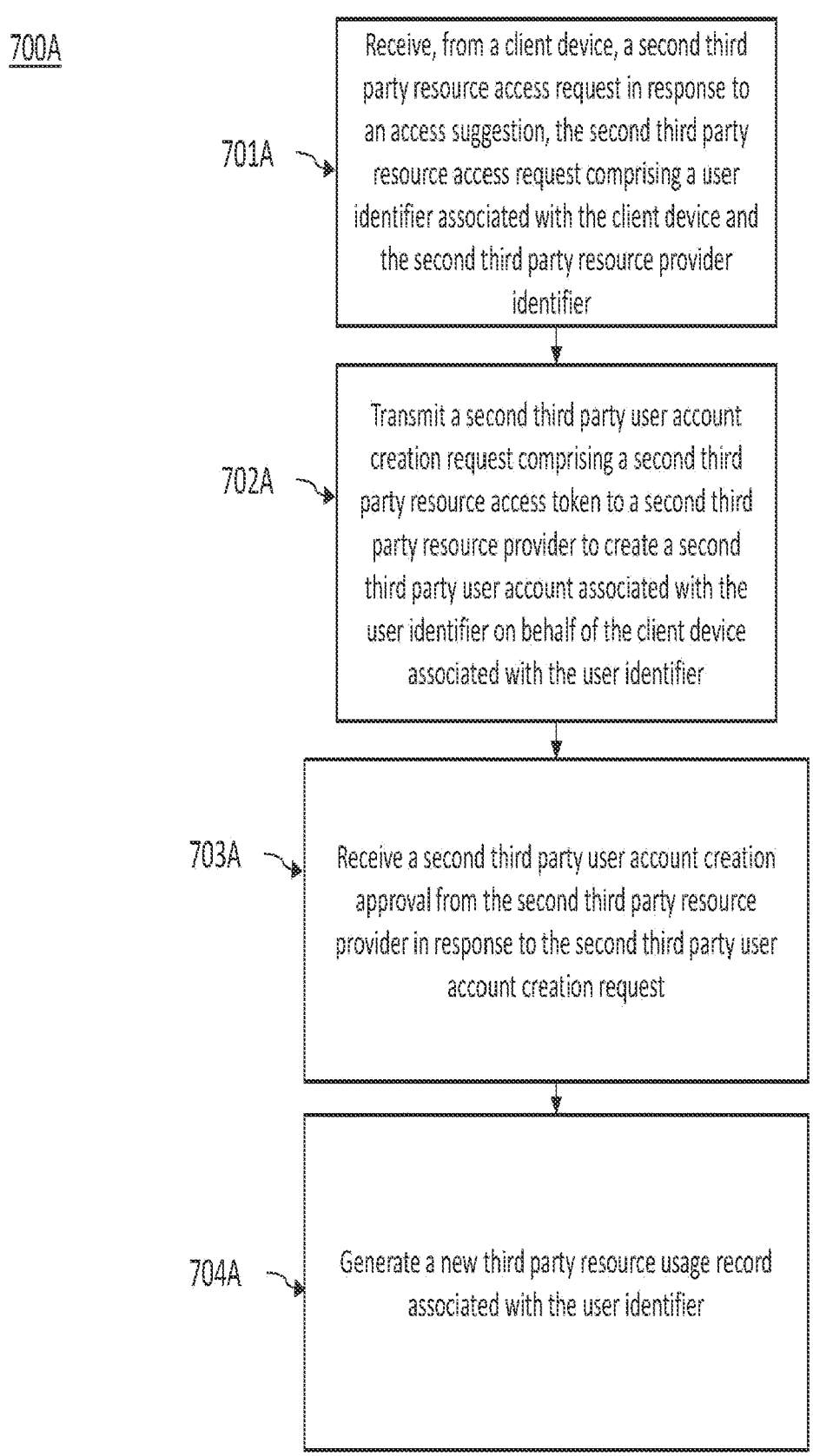
Figure 7B:
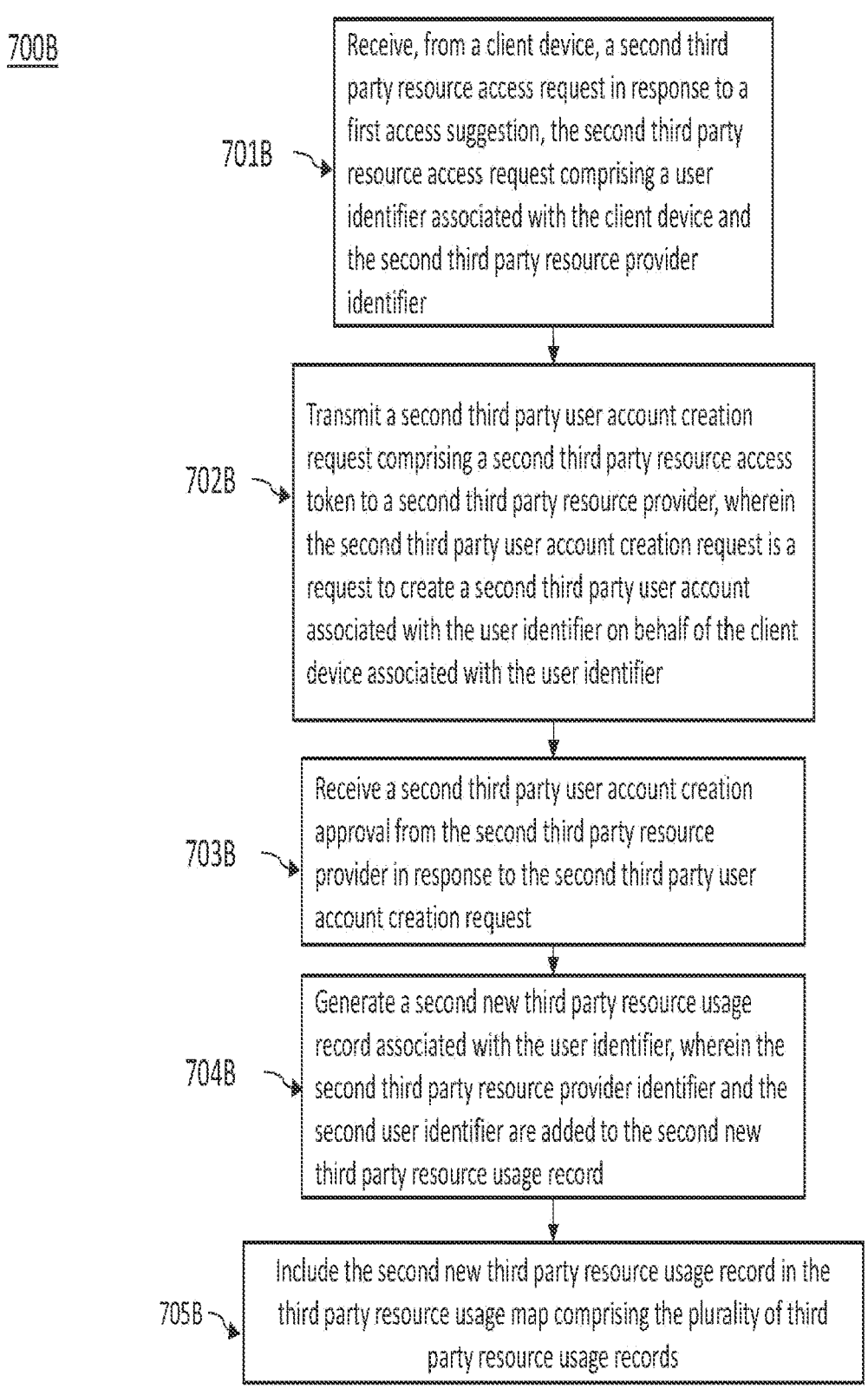

FIGS. 7A and 7B illustrate exemplary processes for maintaining a third-party resource usage map by generating a new third-party resource usage record after creating a third-party user account upon receiving a third-party resource access request in response to an access suggestion according to one embodiment of the present disclosure.

Figure 8:
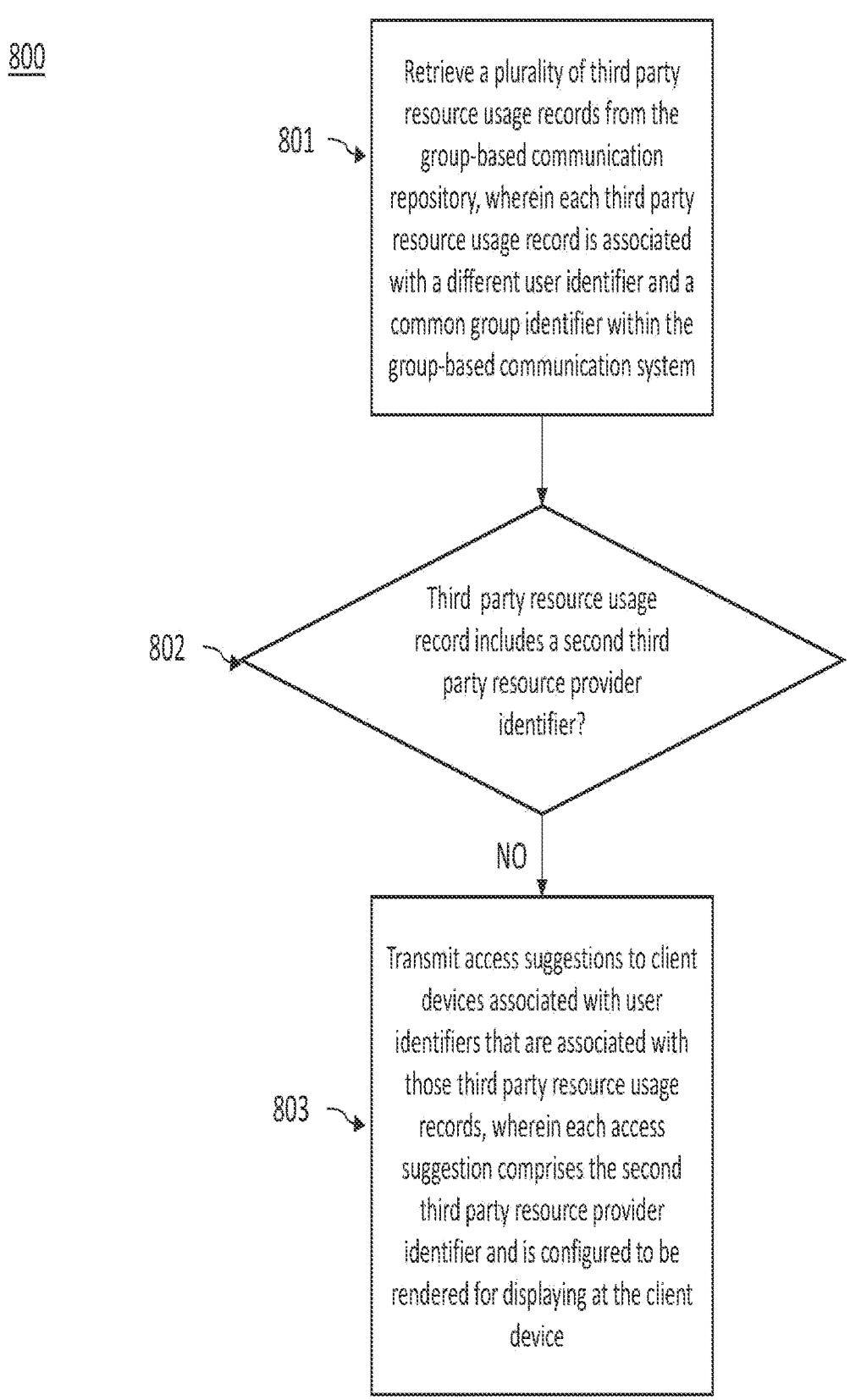

FIG. 8 illustrates an exemplary process for maintaining a third-party resource usage map by transmitting access suggestions to client devices with a common group identifier according to one embodiment of the present disclosure.

Figure 9:
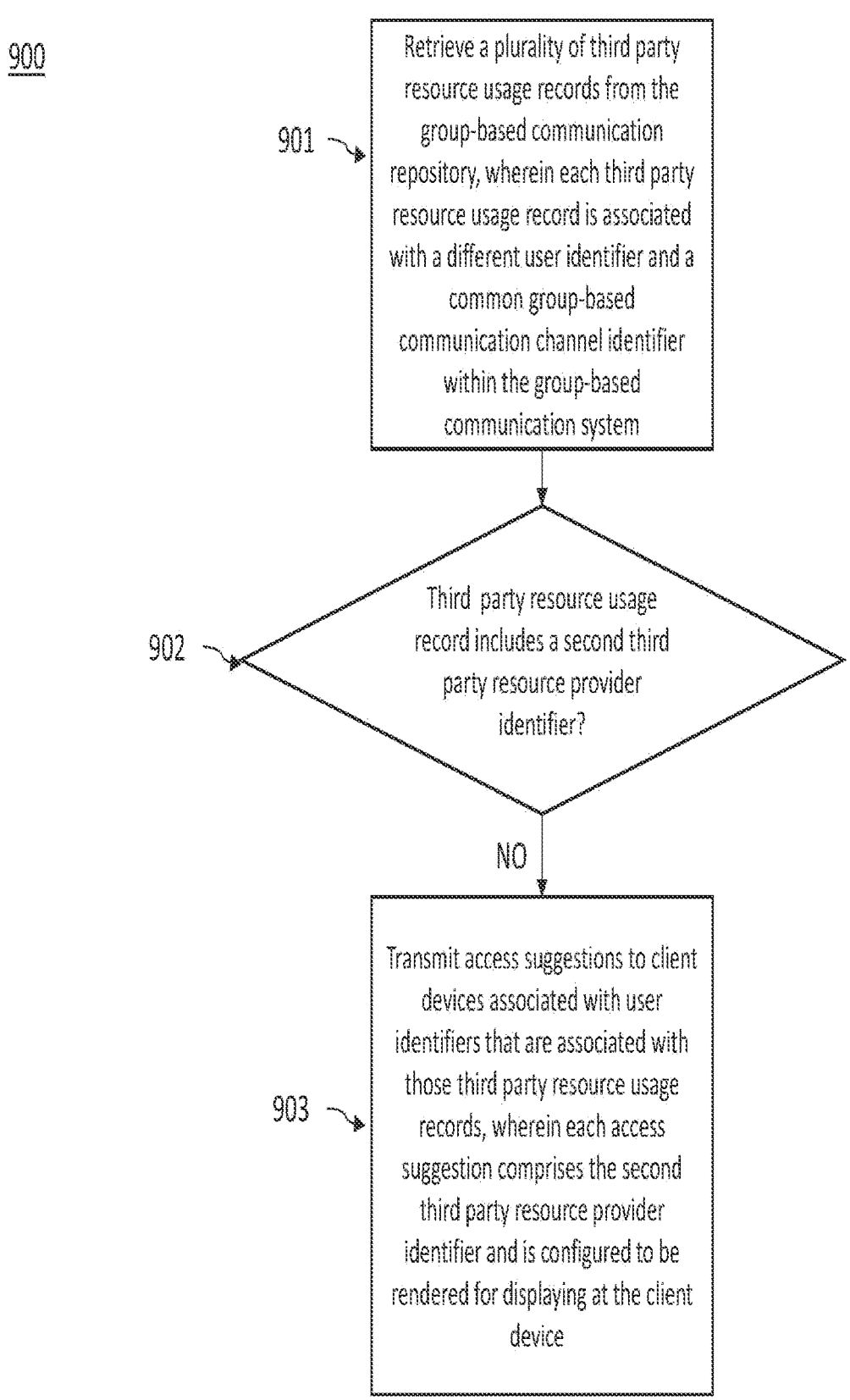

FIG. 9 illustrates an exemplary process for maintaining a third-party resource usage map by transmitting access suggestions to client devices with a common group-based communication channel identifier according to one embodiment of the present disclosure.

Figure 10:
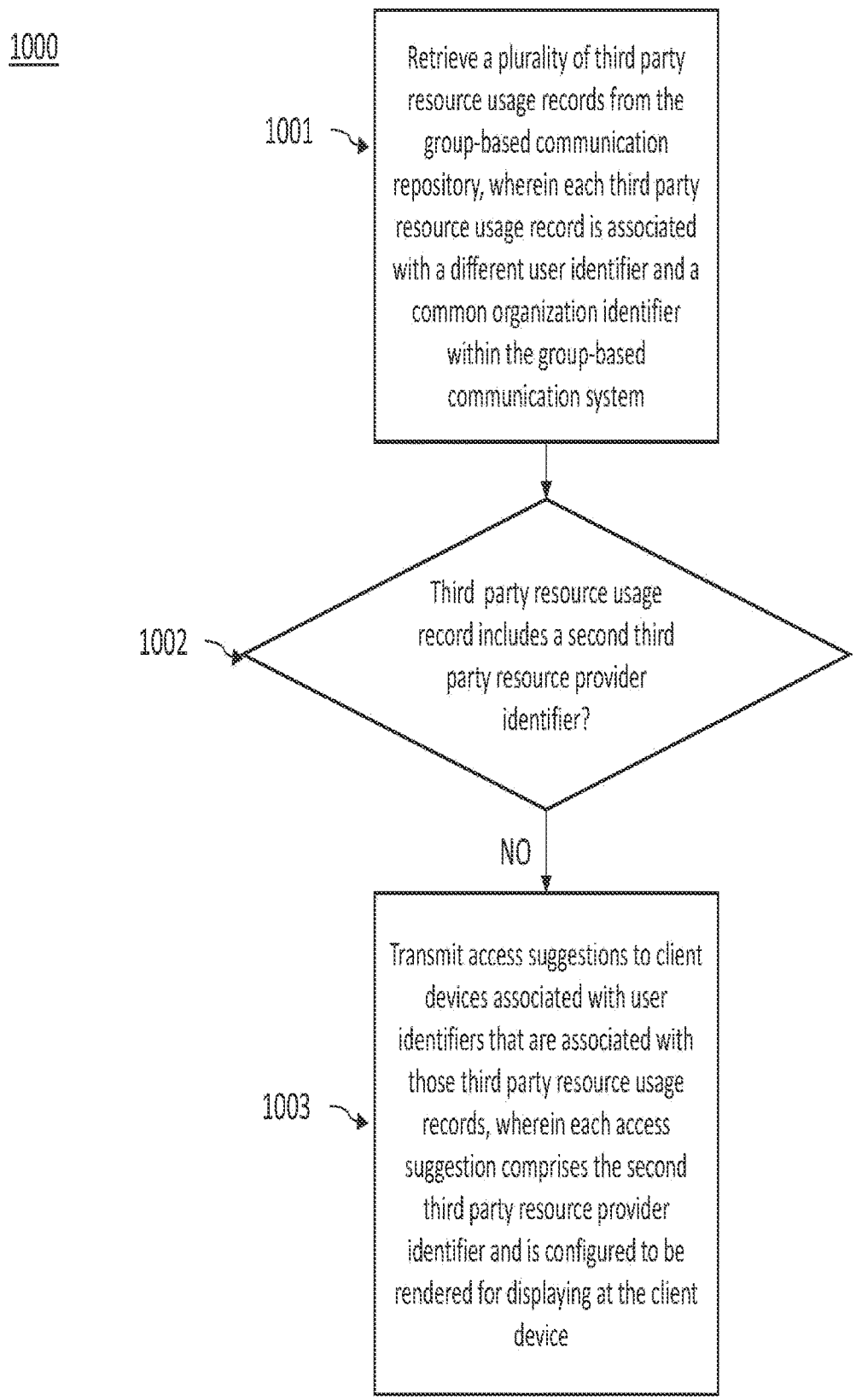

FIG. 10 illustrates an exemplary process for maintaining a third-party resource usage map by transmitting access suggestions to client devices with a common organization identifier according to one embodiment of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to a method for generating a third-party resource usage map in a group based communication system. Embodiments of the present disclosure resolve the issue of generating a third-party resource usage map to determine whether a third-party user account associated with a user identifier has been created on behalf of a client device associated with the user identifier. Through generating a third-party resource usage record as an entry of the third-party resource usage map whenever a third-party user account has been created on behalf of the client device, the third-party resource usage map may be maintained and updated to indicate which third-party resource the client device has access to.

Users in a group-based communications channel or group-based communication group often utilize one or more third-party resources to accomplish various tasks. For example, in a given group-based communications channel, a first third-party resource may be used for document sharing and/or storage, a second third-party resource for team planning, another third-party resource for business planning, and so on.

However, use of multiple third-party resources may require a particular user manage multiple accounts. For example, a user may require a user account with each third-party resource accessed. Such systems are inefficient, as a user may be required to undergo an authentication process, for example entering a username and password, for each third-party resource. Each required authentication process diminishes from the user experience. Additionally, the user must securely maintain user credentials for each third-party resource, or the system is at risk.

Generic computer systems are not configured to create third-party user accounts, and similarly are not configured to manage such third-party user accounts. In accordance with the present invention, third-party user accounts may be created, traced, and utilized for access to third-party resources utilizing a third-party resource usage map. Accordingly, embodiments increase system efficiency, remove additional steps traditionally required, and improve overall system integration with third-party resources.

Moreover, the third-party resource usage map can further be used to make third-party resource access suggestions to client devices based on the groups, the group-based communication channels, or the organization the client devices are associated with. In such embodiments, a third-party resource usage map may provide information to a group-based communication server and/or a third-party resource provider for soliciting client devices to create a third-party user account associated with the third-party resource provider.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers, client devices, and third-party resources (defined below).

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined below.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, one or more organization identifiers for organizations with which the user is associated, one or more third-party resource provider identifiers indicating whether a client device associated with the user profile is authorized to access respective one or more third-party resources, an indication as to whether the user is an owner of any group-based communication channels, an indication as to whether the user has any group-based communication channel restrictions, a plurality of messages, an emoji, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

The terms "organization identifier" or "business identifier" refer to one or more items of data by which an organization entity or a business entity (e.g., employees of each company may be a separate organization/business) within a group-based communication system may be identified. For example, an organization identifier may comprise ASCII text, a pointer, a memory address, and the like.

The term "user identifier" refers to one or more items of data by which a user, or client device associated with a user, within a group-based communication system may be identified. For example, an organization identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may access a group-based communication interface having one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

As used herein, the term "third-party resource" refers to a third-party application that may be integrated in a group-based communication channel within a group-based communication system and may be accessed by a client device accessing the group-based communication channel. For example, a third-party resource may be a Software as a Service (SaaS) product or an Application (App) product that is provided by a third-party resource provider and integrated in a group-based communication system. In such an example, a client device accessing the group-based communication system may access the SaaS or App product via a group-based communication channel that a user of the client device is associated with.

As used herein, the term "third-party resource provider" refers to a provider of a third party resource by way of a remote networked device, such as a server or processing device, maintained by a third-party individual, company, or organization. The third-party resource provider may provide a third-party resource and integrate the third-party resource in a group-based communication system for access by client devices. A client device in a group-based communication system may access a third-party resource integrated in the group-based communication system without separately accessing the third-party resource via a different system. For example, a third-party resource provider may be a Software as a Service (SaaS) product provider or an Application (App) product provider that provides a SaaS or App product integrated in a group-based communication system. In such an example, a client device accessing the group-based communication system may access the SaaS or App product via a group-based communication channel that a user of the client device is associated with.

As used herein, the term "third-party resource provider identifier" refers to one or more items of data by which a third-party resource provider that provides a third-party resource in a group-based communication system may be identified. For example, a third-party resource provider identifier may comprise ASCII text, a pointer, a memory address, and the like. The third party resource provider identifiers associated with respective third-party resource providers may be stored to a third-party resource usage record (defined below) indicating a client device is authorized to access a third-party resource served by a respective third-party resource provider. The third-party resource provider identifiers may be maintained, updated, and stored to a third-party resource usage map comprising a plurality of third-party resource usage records by a group-based communication server.

As used herein, the term "third-party user account" refers to information associated with a user and a third-party resource provider for authenticating a client device associated with the user to access a third-party resource integrated in a group-based communication channel within a group-based communication system, including an email address, a username, a password, and the like.

As used herein, the term "third-party user account creation request" refers to an electronically generated request from a group-based communication server for creating a third-party user account associated with a third-party resource provider on behalf of a user associated with a client device. A third-party user account creation request may include a user identifier and a third-party resource provider identifier to identify the user associated with the client device and the third-party resource the group-based communication server would like to generate the third-party user account on behalf of the user.

As used herein, the term "third-party user account creation approval" refers to an electronically generated approval message from a third-party resource provider that provides an indication to a group-based communication server that a third-party user account has been created for a user in response to the third-party user account creation request (defined above) transmitted by the group-based communication server on behalf of the user associated with the client device. For example, a third-party user account creation approval may be generated after a third-party resource provider receives a third-party user account creation request along with a third-party resource access token (defined below) and verifies the third-party resource access token. In such an example, the third-party user account creation approval provides an indication to a group-based communication server that a third-party user account has been created by verification of the third-party resource access token in the authentication process.

As used herein, the term "third-party resource access request" refers to an electronically generated request from a client device for access to a third-party resource integrated in a group-based communication channel within a group-based communication system. A third-party resource access request may include a user identifier and a third-party resource provider identifier to identify the user associated with the client device and the third party resource the client device would like to access.

As used herein, the term "third-party resource access tokens" refers to a set of security credentials associated with one or more third-party resource providers for authenticating a user's identity in a group-based communication system. The third-party resource access tokens are used for granting a client device access to the one or more third-party resources served by the third-party resource providers. In one example, a third-party resource access token may be a cryptic string that is issued to a group-based communication server by an authentication server with an approval of a third-party resource provider. The group-based communication server may send a third-party user account creation request along with a third-party resource access token to a third-party resource provider for creating a third-party user account on behalf of a client device. In such an example, the third-party resource provider may grant a third-party user account creation approval after the authentication server verified the third-party resource access token.

In another example, a group-based communication server, upon receiving a third-party resource access request from a client device and determining that a third-party user account has been created on behalf of the client device, may send a third-party resource access token to a third-party resource provider on behalf of the client device. In such an example, the third-party resource provider may grant the client device access to the third-party resource after the authentication server verified the third-party resource access token.

In another example, a group-based communication server, upon receiving a third-party resource access request from a client device and determining that a third-party user account has not been created on behalf of the client device, may send a third-party user account creation request along with a third-party resource access token to a third-party resource provider on behalf of the client device. In such an example, the third-party resource provider may grant a third-party user account approval after the authentication server verified the third-party resource access token.

As used herein, the term "third-party resource usage record" refers to set of data associated with a user identifier indicating whether a client device associated with the user identifier has created a third-party user account associated with a third-party resource provider. A third-party resource usage record may include a user identifier, a third-party resource provider identifier, and a third-party resource access token indicating a third-party user account associated with the third-party resource provider has been created. In one example, a third-party resource usage record may include a user identifier, a first third-party resource provider identifier, and a first third-party resource access token indicating a user associated with the user identifier has created a first third-party user account served by a first third-party resource provider.

As used herein, the term "indicative third-party resource usage record" refers to a third-party resource usage record including a target third-party resource provider identifier. In some embodiments, an indicative third-party resource usage record is associated with a particular user identifier. In some embodiments, an indicative third-party resource usage record including a target third-party resource provider identifier indicates that a user account has been created on behalf of a user device associated with the associated user identifier. Similarly, in some embodiments, the lack of an indicative third-party resource usage record in a plurality of third party resource usage records indicates that a user account has not been created on behalf of a user device associated with the associated user identifier.

As used herein, the term "third-party resource usage map" refers to set of data comprising a plurality of third-party resource usage records. A third-party resource usage map may include a plurality of third-party resource usage records providing indications regarding which third-party resources a user associated with a user identifier has created a third-party user account. The third-party resource usage map may be maintained and updated whenever a third party user account has created by a group-based communication server on behalf of a client device.

As used herein, the term "third-party resource usage indicators" refers to a set of data associated with a user profile indicating how often a client device associated with the user profile requests access or logs-in to one or more third-party resources. In one example, a first third-party resource usage indicator may be a value representative of how many times the client device has requested access or logged-in to a first third-party resource. In such an example, a large value of a third-party resource usage indicator represents a high frequency of the third-party resource usage.

As used herein, the term "access suggestion" refers to an electronically generated notification that, when rendered for display on a client device, provides an indication to a user of a client device that a third-party resource is available for access by the client device in a group-based communication channel within a group-based communication system. In one example, an access suggestion may provide an indication to a user of the client device that a third-party resource is available for access within a group with which the user of the client device is associated in a group-based communication system. In another example, an access suggestion may provide an indication to a user of the client device that a third-party resource is available for access within a group-based communication channel with which the user of the client device is associated in a group-based communication system. In another example, an access suggestion may provide an indication to a user of the client device that a third-party resource is available for access within an organization with which the user of the client device is associated in a group-based communication system. An access suggestion may include any text, image, video, audio, or combination thereof associated with a third-party resource. In some examples, an access suggestion may include text (e.g., product name of a third-party resource) as well as image data (e.g., an icon representing a third-party resource or trademark of a third-party resource provider). In some examples, an access suggestion is configured to render for display on a client device a suggestion to a user of the client device to request access to a third-party resource.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. Third-party resource providers 102A-102N may interact with a group-based communication system 105 via a communications network 104. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication server 106 may be embodied as a computer or computers as known in the art. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

The third-party resource providers 102A-102N may be remote networked devices, such as a server or processing device, maintained by a third-party, and configured to provide third party resources integrated in the group-based communication system 105 for access by the client devices 101A-101N. The client devices 101A-101N can communicate with the third-party resource providers 102A-102A via the communication network 104.

In embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third-party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

POST/authrequest.php HTTP/1.1
Host: www.server.com
Content-Type: Application/XML
Content-Length: 667
<?XML version="1.0" encoding="UTF-8" ?>
<auth_request>
   <timestamp>2020-12-3 1 23:59:59</timestamp>
   <user_accounts_details>
     <user_account_credentials>
      <user_name>ID user_1</user_name>
      <password>abc123</password>
      //OPTIONAL <cookie>cookieID</cookie>
      //OPTIONAL<digital_cert_link>www.mydigital-certificate.com/
JohnDoeDaDoeDoe@gmail.com/mycertifcate.dc</digital_cert_link>
      //OPTIONAL <digital_certificate> DATA_</digital_certificate>
     </user_account_credentials>
   </user_accounts_details>
   <client_details>//iOS Client with App and Webkit
     //it should be noted that although several client details
     //sections are provided to show example variants of client
     //sources, further messages will include only on to save
     //space
    <client_IP>10.0.0.123</client_IP>
    <user_agent_string> Mozilla/5.0 (iPhone; CPU iPhone OS 7 1_1 like Mac OS X)
AppleWebKit/537.51.2 (KHTML, like Gecko) Version/7.0 Mobile/11D201
Safari/9537.53</user_agent_string>
    <client_product_type>iPhone6, 1 </client_product_type>
    <client_serial_number> DNXXX1X1XXXX </client_serial_number>
    <client_UDID> 3 D</client_UDID>
    <client_OS>iOS</client_OS>
    <client_OS_version>7.1.1 </client_OS_version>
    <client_app_type>app with webkit</client_app_type>
    <app_installed_flag>true</app_installed_flag>
    <app_name>application.app</app_name>
    <app_version>1.0</app_version>
    <app_webkit_name> Mobile Safari</client_webkit_name>
    <client_version>537.51.2</client_version>
   </client_details>
   <client_details>//iOS Client with Webbrowser
    <client_IP>10.0.0.123</client_IP>
    <user_agent_string> Mozilla/5.0 (iPhone; CPU iPhone OS 7 1_1 like Mac OS X)
AppleWebKit/537.51.2 (KHTML, like Gecko) Version/7.0 Mobile/11D201
Safari/9537.53</user_agent_string>
    <client_product_type>iPhone6, 1</client_product_type>
    <client_serial_number> DNXXX1X1XXXX </client_serial_number>
    <client_UDID>3 D</client_UDID>
    <client_OS>iOS</client_OS>
    <client_OS_version>7.1.1</client_OS_version>
    <client_app_type>web browser</client_app_type>
    <client_name> Mobile Safari</client_name>
    <client_version>9537.53</client_version>
   </client_details>
   <client_details> //Android Client with Webbrowser
    <client_IP>10.0.0.123</client_IP>
    <user_agent_string>Mozilla/5.0 (Linux; U; Android 4.0.4; en-us; Nexus S Build/IMM76D)
AppleWebKit/534.30 (KHTML, like Gecko) Version/4.0 Mobile
Safari/534.30</user_agent_string>
    <client_product_type> Nexus S</client_product_type>
    <client_serial_number> YXXXXXXXXZ</client_serial_number>
    <client_UDID> FXXXXXXXXX-XXXX-XXXX-XXXXXXXXXXXXXXXX</client_UDID>
    <client_OS> Android</client_OS>
    <client_OS_version>4.0.4</client_OS_version>
    <client_app_type>web browser</client_app_type>
    <client_name> Mobile Safari</client_name>
    <client_version>534.30</client_version>
   </client_details>
   <client_details> //Mac Desktop with Webbrowser
    <client_IP> 10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product_type> MacPro5, 1</client_product_type>
    <client_serial_number> YXXXXXXXXZ</client_serial_number>
    <client_UDID> FXXXXXXXXX-XXXX-XXXX-XXXXXXXXXXXXXXXX</client_UDID>
    <client_OS>Mac OS X</client_OS>
    <client_OS_version> 10.9.3</client_OS_version>
    <client_app_type>web browser</client_app_type>
    <client_name> Mobile Safari</client_name>
    <client_version>537.75.14</client_version>

```
</client_details>
<message>
    <message identifier> ID message_1 O</message identifier>
    <team_identifier> ID team_1</team_identifier>
    <channel_identifier> ID channel_1</channel_identifier>
    <contents> That is an interesting invention. I have attached a copy our patent policy. </contents>
    <attachments>patent_policy.pdf</attachments>
</message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third-party metadata, conversation primitive data, and/or the like. For example, the group based communication server 106 may provide the following example storage message, substantially in the form of a HTTP(S) POST message including XML-formatted data, as provided below:

```
POST/storage_message.php HTTP/1.1
Host: www.server.com
Content-Type: Application/XML
Content-Length: 667
<?XML version="1.0" encoding="UTF-8" ?>
<storage_message>
    <message identifier> ID message_I O</message identifier>
    <team_identifier> ID team_I </team_identifier>
    <channel_identifier> ID channel_I </channel_identifier>
    <sending_user_identifier> ID user_I </sending_user_identifier>
    <topics>
        <topic>inventions</topic>
        <topic>patents </topic>
        <topic>policies </topic>
    </topics>
    <responses>
        <response> liked by ID_user_2</response>
        <response>starred by ID_user_3</response>
    </responses>
    <contents> That is an interesting invention. I have attached a copy our patent policy.
    </contents>
    <attachments>patent_policy.pdf</attachments>
    <conversation_primitive>
        conversation includes messages: ID_message_8, ID_message_9,
        ID_message_lO,ID_message_11, ID_message_12
    </conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PUP commands) to determine a sending user identifier of the user who sent the message.

In embodiments, topics may be associated with the message. In one implementation, the message contents may be parsed (e.g., using PUP commands) to determine topics discussed in the message. For example, hashtags in the message may channels associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PUP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID=ID_message_lO.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third-party metadata may be associated with the message. For example, third-party metadata may provide additional context regarding the message or the user that is specific to a company, group, group-based communication channel, and/or the like. In one implementation, the message may be parsed (e.g., using PUP commands) to determine third party metadata. For example, third-party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The server 106 may be embodied by one or more computing systems, such as apparatus 200 shown in FIG. 2. The apparatus 200 may include a processor 202, a memory 201, input/output circuitry 203, communications circuitry 205, group-based communication repository 107 and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or nonvolatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instruction stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of enterprise-based digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Generating a Third-Party Resource Usage Map

FIG. 3 is an exemplary third-party resource usage map for use with embodiments of the present disclosure. The exemplary third-party resource usage map 300 comprises a plurality of information types 310 associated with third-party resource usage records 301-304. The information types 310 associated with the third-party resource usage records 301-304 may include a user identifier, a third-party resource provider identifier, and a third-party resource access token associated with a third-party resource provider. In one example, the third-party resource usage records 301-304 may further comprise a group identifier, a group-based communication channel identifier, or an organization identifier.

FIG. 4A illustrates an exemplary process for maintaining a third-party resource usage map after creating a third-party user account on behalf of a client device according to one embodiment of the present disclosure. The method 400A begins with receiving a third-party resource access token from a third-party resource provider 401A. In some embodiments, the third party resource access token is associated with a third-party resource provider identifier that is associated with the third-party resource provider. In an example embodiment, the third-party resource access token is received when retrieving usage information associated with a third-party resource provider or third-party resource.

The method 400A continues with transmitting a third-party user account creation request comprising the third-party resource access token to the third-party resource provide 402A. In embodiments, the third-party user account creation request is a request to create a third party user account on behalf of a client device. In some embodiments, the third-party user account is associated with the third-party resource provider and the client device is associated with a user identifier. In an example embodiment, a third-party user account creation request is transmitted for a plurality of users in response to a request by an administrator of a group-based communication system, group-based communication channel, or group-based communication group.

The method 400A continues with receiving a third-party user account creation approval from the third-party resource provider in response to the third-party user account creation request 403A. In some embodiments, the third-party user account creation approval is received after verifying the third-party resource access token for creating the third-party user account on behalf of the client device. In some embodiments, the third-party user account is associated with the third-party resource provider and the client device is associated with the user identifier.

Finally, the method 400A further continues with generating a third-party resource usage record associated with the user identifier, the third-party resource usage record comprising the user identifier, the third-party resource provider identifier, and the third-party resource access token 404A. In embodiments, the third-party resource usage record indicates the third-party user account associated with the third-party resource provider was created on behalf of the client device associated with the user identifier. In some embodiments, a third-party resource usage record further comprises a third-party resource usage indicator associated with a particular third party resource provider, or corresponding third-party resource provider identifier, for tracking how the client device accesses the first third-party resource provider. In some embodiments, different third-party resource usage records include different third-party resource usage indicators.

FIG. 4B illustrates another exemplary process for maintaining a third-party resource usage map, after generating a first new third-party resource usage record after creating a first third-party user account on behalf of a client device according to one embodiment of the present disclosure.

The method 400B begins with receiving, from a third-party resource provider, a first third-party resource access token from a third-party resource provider 401B. In some embodiments, the first third-party resource access token is associated with a first third-party resource provider identifier that is associated with the first third-party resource provider.

The method 400B continues with transmitting a first third-party user account creation request comprising the first third-party resource access token to the first third-party resource provider 402B. In embodiments, the first third-party user account creation request is a request to create a first third-party user account on behalf of a first client device. In some embodiments, the first third-party user account is associated with the first third-party resource provider and the first client device is associated with a first user identifier.

The method 400B continues with receiving a first third-party user account creation approval from the first third-party resource provider in response to the first third-party user account creation request 403B. In some embodiments, the first third-party user account creation approval is received after verifying the first third-party resource access token for creating the first third-party user account on behalf of the first client device. In some embodiments, the first third party user account is associated with the first third-party resource provider and the first client device is associated with the first user identifier.

The method 400B further continues with generating a first new third-party resource usage record associated with the first new user identifier, the first new third-party resource usage record comprising the first user identifier, the first third-party resource provider identifier, and the first third-party resource access token 404B. In embodiments, the first new third-party resource usage record indicates the first third-party user account associated with the first third party resource provider was created on behalf of the first client device associated with the first user identifier. In some embodiments, a first new third-party resource usage record further comprises a first third-party resource usage indicator associated with a first third-party resource provider, or corresponding first third-party resource provider identifier, for tracking how the first client device accesses the first third-party resource provider. In some embodiments, different third-party resource usage records may include different third-party resource usage indicators.

The method 400B further continues with adding the first new third-party resource usage record to the third-party resource usage map. In some embodiments, the first new third party resource usage record is appended to a plurality of third-party resource usage records that comprise the third-party resource usage map. In an example embodiment, the first new third party resource usage record is associated with the plurality of third-party resource usage records such that the new third-party resource usage record is retrievable using an associated user identifier. In some embodiments, the first user identifier, the first third-party resource provider identifier, and the third-party resource provider is added to the first new third-party resource usage record information.

FIG. 5A illustrates an exemplary process for maintaining a new third-party resource usage map after creating a third-party user account upon receiving a third-party resource access request from a client device according to one embodiment of the present disclosure.

The method 500A begins with receiving a first third-party resource access request from the client device 501A. In some embodiments, the first third-party resource access request comprises the user identifier and a first third-party resource provider identifier associated with a first third-party resource provider. In some embodiments, a third-party resource usage record may further comprise a first third-party resource usage indicator associated with a first third-party resource provider for tracking how the client device accesses the first third-party resource provider.

The method 500A continues with searching the third-party resource usage record associated with the user identifier to determine if a first third-party user account was created on behalf of the client device associated with the user identifier 502A.

In a circumstance where the first third-party resource provider identifier is determined to exist within the third-party resource usage record associated with the user identifier, the method 500A continues with transmitting a first third-party resource access token to the first third-party resource provider to enable the client device access to a first third-party resource 503A.

In a circumstance where the first third-party resource provider identifier is not determined to be stored to the third-party resource usage record associated with the user identifier, the method 500A continues with transmitting a first third-party user account creation request comprising the first third-party resource access token to the first third-party resource provider 505A. In embodiments, the first third-party user account creation request is a request to create the first third-party user account on behalf of the client device associated with the user identifier. The method 500A further continues with receiving a first third-party user account creation approval from the first third-party resource provider in response to the first third-party user account creation request 506A. In some embodiments, the first third-party user account creation approval is received for creating the first third-party user account on behalf of the client device and the client device is associated with the user identifier. Finally, the method 500A continues with generating a new third-party resource usage record associated with the user identifier 507 A. In embodiments, the first third-party resource provider identifier and the user identifier are added to the new third-party resource usage record. In embodiments, the new third party resource usage record is associated with the first third-party resource access token.

FIG. 5B illustrates an exemplary process for maintaining a new third-party resource usage map after creating a third-party user account upon receiving a first third-party resource access request from a first client device according to one embodiment of the present disclosure.

In some embodiments, the method 500B begins with receiving a first third-party resource access token 501B. In an example embodiment, the first third-party resource access token is received from a first third-party resource provider. In some embodiments, the first third party resource access token is associated with a first third-party resource provider identifier associated with a first third-party resource provider.

The method 500B continues with receiving a first third-party resource access request from the first client device 502B. In some embodiments, the first third-party resource access request comprises the first user identifier and a first third-party resource provider identifier associated with a first third-party resource provider.

The method 500B continues with searching the third-party resource usage map for an indicative third-party resource usage record associated with the first user identifier, wherein the indicative third-party resource usage record comprises the first third-party resource provider 503B.

In some embodiments, the existence of such an indicative third-party resource usage record indicates a first third-party user account was created on behalf of the first client device associated with the first user identifier.

In a circumstance where the search result is indicative that the first third-party resource usage map contains the indicative third-party resource usage record, at decision 504B, the method 500B continues with transmitting a first third-party resource access token to the first third-party resource provider to enable the client device access to a first third-party resource 505*b*. In an example embodiment, the search locates the indicative third-party resource usage record. In some embodiments, the search returns the located indicative third-party resource usage record.

In a circumstance where the search result is indicative that the first third-party resource usage map does not contain the indicative third-party resource usage record, at decision 504B, the method 500B continues with transmitting a first third-party user account creation request comprising the first third-party resource access token to the first third-party resource provider 506B. In some embodiments, the first third-party user account creation request is a request to create the first third-party user account on behalf of the client device associated with the user identifier.

The method 500B further continues with receiving a first third-party user account creation approval from the first third-party resource provider in response to the first third-party user account creation request 507B. In some embodiments, the first third-party user account creation approval is received for creating the first third-party user account on behalf of the client device and the client device is associated with the user identifier.

The method 500B continues with generating a new third-party resource usage record associated with the user identifier 508B. In embodiments, the first third-party resource provider identifier and the user identifier are added to the new third-party resource usage record. In embodiments, the new third-party resource usage record is associated with the first third-party resource access token. Alternatively or additionally, in some embodiments, the new third-party resource usage record is associated with the first user identifier. In some embodiments, the new third-party resource usage record comprises the first user identifier, the first third-party resource provider identifier, and the first third-party resource access token.

The method 500B further continues with including the new third-party resource usage record in the third-party resource usage map 509B. In an example embodiment, the new third party resource usage record is appended to the plurality of third-party resource usage records that comprise the third-party resource usage map. In an example embodiment, the new third-party resource usage record is associated with the plurality of third-party resource usage records such that the new third-party resource usage record is retrievable using an associated user identifier.

FIG. 6A illustrates an exemplary process for transmitting access suggestions to client devices according to one embodiment of the present disclosure. The method 600A begins with retrieving a plurality of third-party resource usage records from a group-based communication repository 601A. In embodiments, each third-party resource usage record is associated with a different user identifier within the group-based communication system. The method 600A continues with determining whether any of the third-party resource usage records include a second third-party resource provider identifier 602A. For those client devices associated with those user identifiers associated with third-party resource usage records not including the second third-party resource provider identifier, the method 600A continues with transmitting access suggestions to those client devices 603A. In some embodiments, the access suggestion comprises the second third-party resource provider identifier and is configured to be rendered for display at the client devices.

FIG. 6B illustrates an exemplary process for maintaining a third-party resource usage map to transmit access suggestions to client devices according to one embodiment of the present disclosure. The method 600B begins with retrieving a subset plurality of third-party resource usage records 601B. In some embodiments, the subset plurality of third-party resource usage records is retrieved from a third-party resource usage map. In some embodiments, the subset plurality of third-party resource usage records is retrieved from a group-based communication repository, such as a group-based communication repository storing one or more third-party resource usage map. In some embodiments, each third-party resource usage record in the subset plurality of third-party resource usage records is associated with a user identifier that is different than a particular first user identifier. For example, in an example embodiment, a first user identifier associated with a first client device is associated with a particular third-party resource through a method described above, and each third-party resource usage record in the subset plurality of third-party resource usage records is associated with a user identifier that is different than the first user identifier.

The method 600B continues with determining at least one subset third-party resource usage record in the subset plurality of third-party resource usage records that includes a second third-party resource provider identifier whether any of the third-party resource usage records include a second third-party resource provider identifier, at decision 602B. For example, in an example embodiment, a first third-party user account associated with a first third-party resource is created, and the third-party user account is associated with a first user identifier that is associated with a first client device. Continuing the example, in some embodiments, a first third party resource usage record is generated, for example as part of a method described above, such that the first third-party resource usage record includes a first third-party resource provider identifier associated with a first third-party service provider that offers the first third-party resource for which an account was created. In some embodiments, the subset third-party resource usage records identified, at decision 602B, does not include a second third-party resource, for example a second third-party resource provider identifier that is different than the first third-party resource provider identifier. In some embodiments, more than one subset third-party resource usage record is determined.

The method 600B continues with transmitting an access suggestion to a second client device associated with the second user identifier. In an example embodiment, the subset third party resource usage record(s) determined at decision 602B are associated with a second user identifier. In some embodiments, one or more access suggestions are then transmitted to a second client device associated with the second user identifier. In some embodiments, the second client device is different than an earlier associated first user identifier, such that client devices other than a registering client device receive one or more access suggestions. In some embodiments, an access suggestion comprises the second third-party resource provider identifier and is configured to be rendered for display at the client devices.

FIG. 7A illustrates an exemplary process for generating a new third-party resource usage record after creating a third-party user account upon receiving a third-party resource access request in response to an access suggestion according to one embodiment of the present disclosure.

The method 700A begins with receiving a second third-party resource access request in response to an access suggestion from a client device 701A. In embodiments, the second third party resource access request may comprise the user identifier associated with the client device and the second third-party resource provider identifier.

The method 700A continues with transmitting a second third-party user account creation request comprising a second third-party resource access token to a second third-party resource provider 702A. In embodiments, the second third-party user account creation request is a request to create a second third-party user account on behalf of the client device. In some embodiments, the second third-party user account is associated with the user identifier and the client device is also associated with the user identifier.

The method 700A continues with receiving a second third-party user account creation approval from the second third-party resource provider in response to the second third-party user account creation request 703A. In some embodiments, the client device is associated with the user identifier.

After receiving the second third-party user account creation approval from the second third-party resource provider, the method 700A continues with generating a new third-party resource usage record associated with the user identifier. In embodiments, the second third-party resource provider identifier and user identifier are added to the new third-party resource usage record 704A. In some embodiments, the new third-party resource usage record is associated with the second third-party resource access token.

FIG. 7B illustrates an exemplary process for maintaining a new third-party resource usage map after creating a third-party user account upon receiving a third-party resource access request in response to an access suggestion according to one embodiment of the present disclosure.

The method 700B begins with receiving a second third-party resource access request in response to an access suggestion from a client device 701B. In embodiments, the second third party resource access request may comprise the user identifier associated with the client device and the second third-party resource provider identifier. In some embodiments, the client device is a first client device from which a first third-party resource access request was received, and wherein the first client device then received an access suggestion. In some embodiments, the client device is a second client device, which received an access suggestion associated with a first client device.

The method 700B continues with transmitting a second third-party user account creation request comprising a second third-party resource access token to a second third-party resource provider 702B. In embodiments, the second third-party user account creation request is a request to create a second third-party user account on behalf of the client device. In some embodiments, the second third-party user account is associated with the user identifier and the client device is also associated with the user identifier.

The method 700B continues with receiving a second third-party user account creation approval from the second third-party resource provider in response to the second third-party user account creation request 703B. In some embodiments, the client device is associated with the user identifier.

After receiving the second third-party user account creation approval from the second third-party resource provider, the method 700B continues with generating a second new third party resource usage record associated with the user identifier. In some embodiments, the second new third-party resource usage record is indicative that a user account was created for the user identifier. In some embodiments, the second new third-party resource usage record is associated with a second user identifier that is associated with a second client device, distinct from a first user identifier associated with a first client device that caused the access suggestion to be sent. In some embodiments, the second new third-party resource usage record is associated with a first user identifier that is associated with a first client device associated with causing the accession suggestion to be sent.

In some embodiments, the second third-party resource provider identifier and user identifier are added to the new third-party resource usage record 704B. In some embodiments, the second new third-party resource usage record is associated with the second third-party resource access token. In some embodiments, the second third-party resource usage record is generated comprising the user identifier, the second new third-party resource provider identifier, and the second third-party resource access token. In some embodiments, the second new third party resource usage record indicates the second third-party user account associated with the second third-party resource provider was created on behalf of the client device associated with the user identifier. In some embodiments, the second new third-party resource usage record may further comprise a second third-party usage indicator associated with the second first third-party resource provider for tracking how the client device accesses the second third-party resource provider.

The method 700B further continues with adding the second new third-party resource usage record to a third-party resource usage map 705B. In an example embodiment, the second new third-party resource usage record is appended to the plurality of third-party resource usage records that comprise the third-party resource usage map. In an example embodiment, the second new third-party resource usage record is associated with the plurality of third-party resource usage records such that the second new third-party resource usage record is retrievable using an associated user identifier.

FIG. 8 illustrates an exemplary process for transmitting access suggestions to client devices associated with a common group identifier according to one embodiment of the present disclosure. Method 800 begins with retrieving a plurality of third-party resource usage records associated with a common group identifier from a group-based communication repository 801. In embodiments, each third-party resource usage record is associated with a different user profile that is associated with the common group identifier. In some embodiments, a subset plurality of third-party resource usage records is retrieved. In some embodiments, the subset plurality of third party resource usage records is retrieved from a third-party resource usage map. In some embodiments, the subset plurality of third-party resource usage records is retrieved from a group-based communication repository, such as a group-based communication repository storing one or more third-party resource usage map(s).

In some embodiments, the subset plurality of third-party resource usage records includes multiple subset third-party resource usage records. In some embodiments, each subset third-party resource usage record is associated with a different user identifier than a first user identifier, for example, such that the first identifier is not equivalent to each different user identifier. In some embodiments, different user identifiers may be distinct from one another as well. In some embodiments, some of the subset third-party resource usage records include a second third-party resource provider identifier. In some embodiments, some of the subset third party resource usage records do not include a second third-party resource provider identifier.

The method 800 continues with determining whether any of the third-party resource usage records include a second third-party resource provider identifier 802. In an example embodiment, at least one subset third-party resource usage record in the subset plurality of third party resource usage records does not include a second third-party resource provider identifier. In some embodiments, for those client devices associated with those user identifiers that are associated with those third-party resource usage records not including a second third-party resource provider identifier, the method 800 continues with transmitting access suggestions to those client devices 803. In some embodiments, the access suggestions are configured to be rendered for display at the client devices. In an example embodiment, the method continues with transmitting an access suggestion to a second client device associated with a second user identifier associated with a particular subset third-party resource usage record determined at determination 802.

FIG. 9 illustrates an exemplary process for transmitting access suggestions to client devices with a common group-based communication channel identifier according to one embodiment of the present disclosure. Method 900 begins with retrieving a plurality of third party resource usage records associated with a common group-based communication channel identifier from a group-based communication repository 901. In embodiments, each third-party resource usage record is associated with a different user identifier having the common group-based communication channel identifier.

In some embodiments, a subset plurality of third-party resource usage records is retrieved. In some embodiments, the subset plurality of third-party resource usage records is retrieved from a third-party resource usage map. In some embodiments, the subset plurality of third-party resource usage records is retrieved from a group-based communication repository, such as a group-based communication repository storing one or more third-party resource usage map(s).

In some embodiments, the subset plurality of third-party resource usage records includes multiple subset third-party resource usage records. In some embodiments, each subset third-party resource usage record is associated with a different user identifier than a first user identifier, for example, such that the first identifier is not equivalent to each different user identifier. In some embodiments, different user identifiers may be distinct from one another as well. In some embodiments, some of the subset third-party resource usage records include a second third-party resource provider identifier. In some embodiments, some of the subset third party resource usage records do not include a second third-party resource provider identifier.

The method 900 continues with determining whether any of the third-party resource usage records include a second third-party resource provider identifier 902. In an example embodiment, at least one subset third-party resource usage record in the subset plurality of third party resource usage records does not include a second third-party resource provider identifier. In some embodiments, for those client devices associated with those user identifiers that are associated with third-party resource usage records not including a second third-party resource provider identifier, the method 900 continues with transmitting access suggestions to those client devices 903. In some embodiments, the subscription suggestions are configured to be rendered for display at the client devices. In an example embodiment, the method continues with transmitting an access suggestion to a second client device associated with a second user identifier associated with a particular subset third-party resource usage record determined at determination 902.

FIG. 10 illustrates an exemplary process for transmitting access suggestions to client devices associated with a common organization identifier according to one embodiment of the present disclosure. Method 1000 begins with retrieving a plurality of third-party resource usage records associated with a common organization identifier from a group-based communication repository 1001. In embodiments, each third-party resource usage record is associated with a different user identifier associated with the common organization identifier.

In some embodiments, a subset plurality of third-party resource usage records is retrieved. In some embodiments, the subset plurality of third-party resource usage records is retrieved from a third-party resource usage map. In some embodiments, the subset plurality of third-party resource usage records is retrieved from a group-based communication repository, such as a group-based communication repository storing one or more third-party resource usage map(s).

In some embodiments, the subset plurality of third-party resource usage records includes multiple subset third-party resource usage records. In some embodiments, each subset third-party resource usage record is associated with a different user identifier than a first user identifier, for example, such that the first identifier is not equivalent to each different user identifier. In some embodiments, different user identifiers may be distinct from one another as well. In some embodiments, some of the subset third-party resource usage records include a second third-party resource provider identifier. In some embodiments, some of the subset third party resource usage records do not include a second third-party resource provider identifier.

The method 1000 continues with determining whether any of the third-party resource usage records include a second third-party resource provider identifier 1002. In an example embodiment, at least one subset third-party resource usage record in the subset plurality of third party resource usage records does not include a second third-party resource provider identifier. In some embodiments, for those client devices associated with those user identifiers that are associated with those third-party resource usage records not including a second third-party resource provider identifier, the method 1000 continues with transmitting access suggestions to those client devices 1003. In some embodiments, the access suggestions are configured to be rendered for display at the client devices. In an example embodiment, the method continues with transmitting an access suggestion to a second client device associated with a second user identifier associated with a particular subset third-party resource usage record determined at determination 1002.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Conclusion

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, implemented at least in part by a server computing device associated with a group-based communication platform, comprising:
    receiving, from a first third-party resource provider, a first third-party resource access token;
    receiving, from a first client device associated with a first user, a first third-party resource access request, the first third-party resource access request comprising a first user identifier and a first third-party resource provider identifier;
    retrieving, based at least in part on receiving the first third-party resource access request and from a group-based communication repository maintained by the group-based communication platform, a plurality of third-party resource usage records, wherein individual ones of the plurality of third-party resource usage records are associated with a different user identifier;
    determining that a second third-party resource provider identifier associated with a second third-party resource provider is absent from the plurality of third-party resource usage records; and
    transmitting, to respective client devices associated with the individual ones of the plurality of third-party resource usage records, a recommendation to access a second third-party resource, wherein the recommendation to access the second third-party resource comprises the second third-party resource provider identifier.

2. The method of claim 1, wherein the recommendation to access the second third-party resource is configured to be rendered for display on individual ones of the respective client devices.

3. The method of claim 1, further comprising:
    receiving, from a second client device of the respective client devices and in response to a recommendation to access the second third-party resource, a second third-party resource access request, the second third-party resource access request comprising a second user identifier associated with a second user and the second third-party resource provider identifier; and
    transmitting, to the second third-party resource provider, a second third-party resource user account creation request, the second third-party resource user account creation request comprising a second third-party resource access token.

4. The method of claim 3, further comprising returning, as a result of searching a third-party resource usage map, an indicative third-party resource usage record associated with the second user identifier, the indicative third-party resource usage record comprising the second third-party resource provider identifier.

5. The method of claim 3, wherein the second third-party resource user account creation request is a request to create a second third-party resource user account on behalf of the second client device.

6. The method of claim 1, further comprising:
    transmitting, to the first third-party resource provider, a first third-party resource user account creation request;
    receiving, in response to the first third-party resource user account creation request, a first third-party resource user account creation approval; and
    generating a new third-party resource usage record associated with the first user identifier.

7. The method of claim 6, wherein the new third-party resource usage record comprises one or more of the first third-party resource provider identifier and the first third-party resource access token.

8. The method of claim 6, further comprising including the new third-party resource usage record in a third-party resource usage map.

9. A system comprising:
    one or more processors; and
    computer readable media storing instructions that, when executed, cause the system to perform operations comprising:
        receiving, from a first third-party resource provider, a first third-party resource access token;
        receiving, from a first client device associated with a first user, a first third-party resource access request, the first third-party resource access request comprising a first user identifier and a first third-party resource provider identifier;
        retrieving, based at least in part on receiving the first third-party resource access request and from a group-based communication repository maintained by a group-based communication platform, a plurality of third-party resource usage records, wherein individual ones of the plurality of third-party resource usage records are associated with a different user identifier;
        determining that a second third-party resource provider identifier associated with a second third-party resource provider is absent from the plurality of third-party resource usage records; and
        transmitting, to respective client devices associated with the individual ones of the plurality of third-party resource usage records, a recommendation to access a second third-party resource, wherein the recommendation to access the second third-party resource comprises the second third-party resource provider identifier.

10. The system of claim 9, the operations further comprising:

receiving, from a second client device of the respective client devices and in response to a recommendation to access the second third-party resource, a second third-party resource access request, the second third-party resource access request comprising a second user identifier associated with a second user and the second third-party resource provider identifier; and transmitting, to the second third-party resource provider, a second third-party resource user account creation request, the second third-party resource user account creation request comprising a second third-party resource access token.

11. The system of claim 10, wherein the second third-party resource user account creation request is a request to create a second third-party resource user account on behalf of the second client device.

12. The system of claim 10, the operations further comprising returning, as a result of searching a third-party resource usage map, an indicative third-party resource usage record associated with the second user identifier, the indicative third-party resource usage record comprising the second third-party resource provider identifier.

13. The system of claim 9, the operations further comprising:
transmitting, to the first third-party resource provider, a first third-party resource user account creation request; and
receiving, in response to the first third-party user account creation request, a first third-party user account creation approval.

14. The system of claim 11, the operations further comprising generating a new third-party resource usage record associated with the first user identifier.

15. One or more non-transitory computer readable media storing computer-executable instructions that, when executed by one or more processors of a computing device, cause the computing device to perform operations comprising:
receiving, from a first third-party resource provider, a first third-party resource access token;
receiving, from a first client device associated with a first user, a first third-party resource access request, the first third-party resource access request comprising a first user identifier and a first third-party resource provider identifier;
retrieving, based at least in part on receiving the first third-party resource access request and from a group-based communication repository maintained by a group-based communication platform, a plurality of third-party resource usage records, wherein individual ones of the plurality of third-party resource usage records are associated with a different user identifier;
determining that a second third-party resource provider identifier associated with a second third-party resource provider is absent from the plurality of third-party resource usage records; and
transmitting, to respective client devices associated with the individual ones of the plurality of third-party resource usage records, a recommendation to access a second third-party resource, wherein the recommendation to access the second third-party resource comprises the second third-party resource provider identifier.

16. The one or more non-transitory computer readable media of claim 15, the operations further comprising:
receiving, from a second client device of the respective client devices and in response to a recommendation to access the second third-party resource, a second third-party resource access request, the second third-party resource access request comprising a second user identifier associated with a second user and the second third-party resource provider identifier; and
transmitting, to the second third-party resource provider, a second third-party resource user account creation request, the second third-party resource user account creation request comprising a second third-party resource access token.

17. The one or more non-transitory computer readable media of claim 16, wherein the second third-party resource user account creation request is a request to create a second third-party resource user account on behalf of the second client device.

18. The one or more non-transitory computer readable media of claim 16, the operations further comprising returning, as a result of searching a third-party resource usage map, an indicative third-party resource usage record associated with the second user identifier, the indicative third-party resource usage record comprising the second third-party resource provider identifier.

19. The one or more non-transitory computer readable media of claim 15, the operations further comprising:
transmitting, to the first third-party resource provider, a first third-party resource user account creation request; and
receiving, in response to the first third-party resource user account creation request, a first third-party resource user account creation approval.

20. The one or more non-transitory computer readable media of claim 19, the operations further comprising generating a new third-party resource usage record associated with the first user identifier.

* * * * *